June 24, 1958     A. WOOD     2,839,921
POSITION INDICATOR
Filed Sept. 21, 1955     4 Sheets-Sheet 1
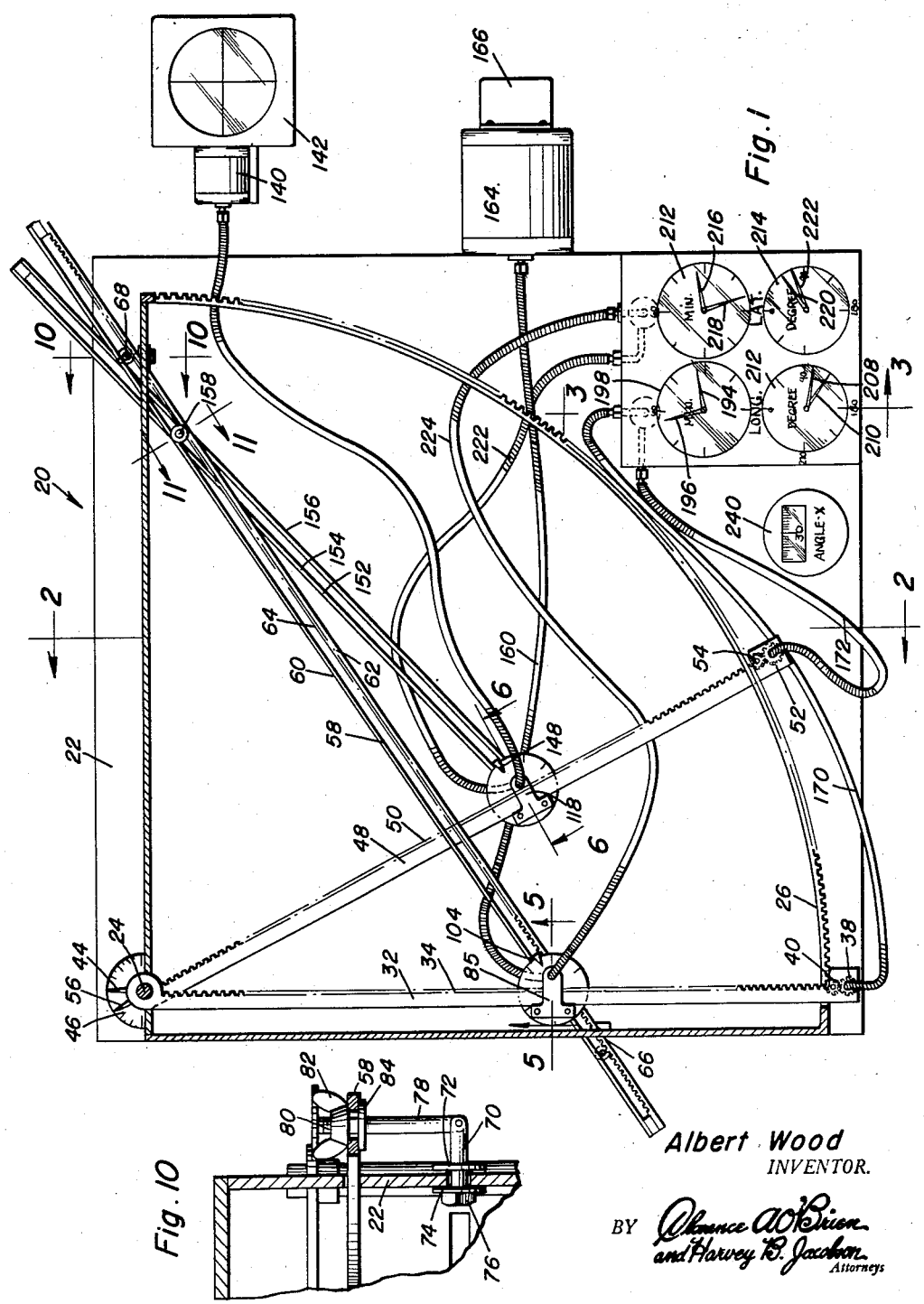
Albert Wood
INVENTOR.

June 24, 1958   A. WOOD   2,839,921
POSITION INDICATOR
Filed Sept. 21, 1955   4 Sheets-Sheet 2
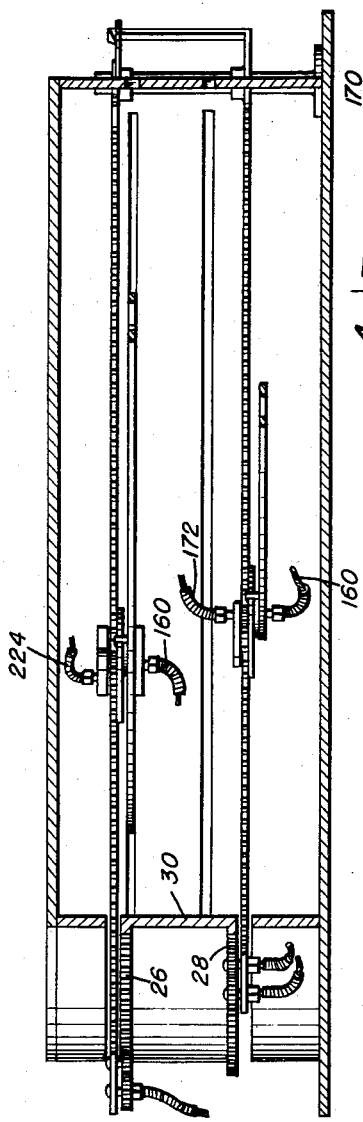
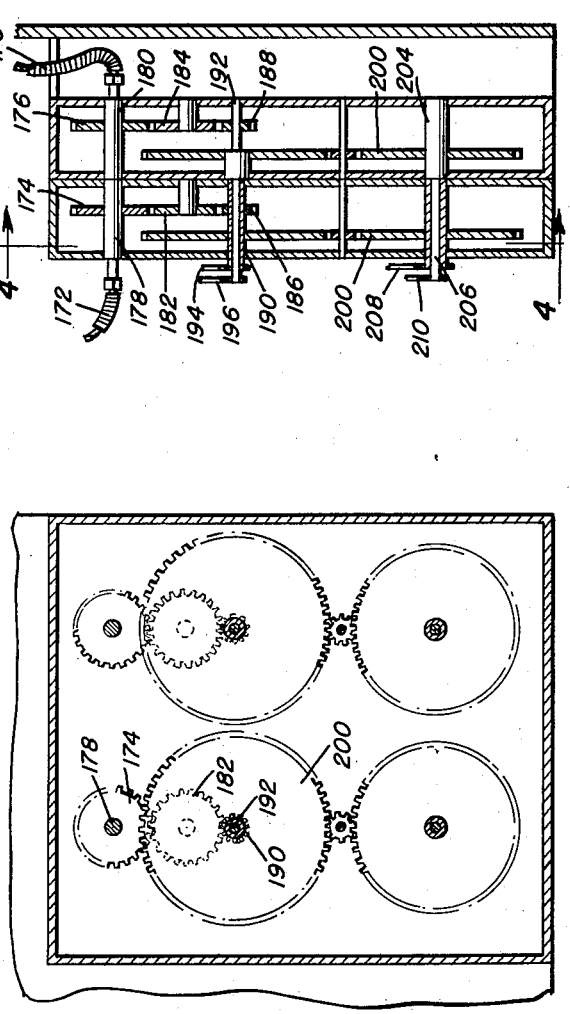
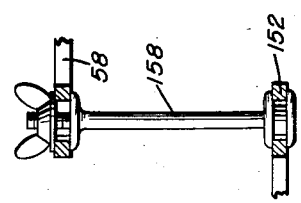
Albert Wood
INVENTOR.

June 24, 1958  A. WOOD  2,839,921
POSITION INDICATOR
Filed Sept. 21, 1955  4 Sheets-Sheet 3
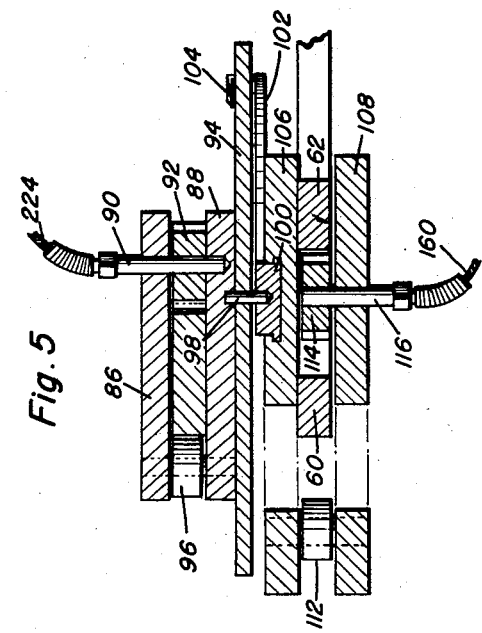
Albert Wood
INVENTOR.

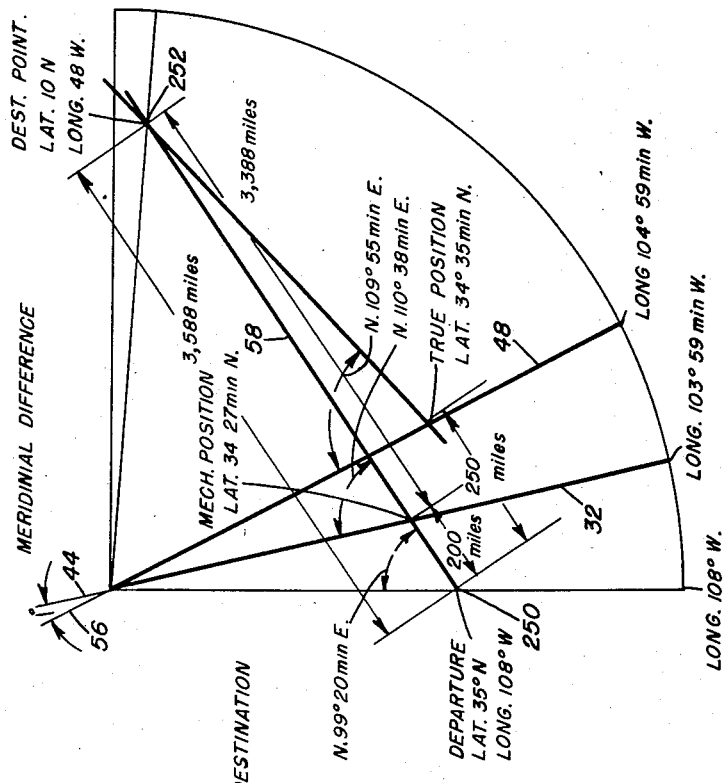
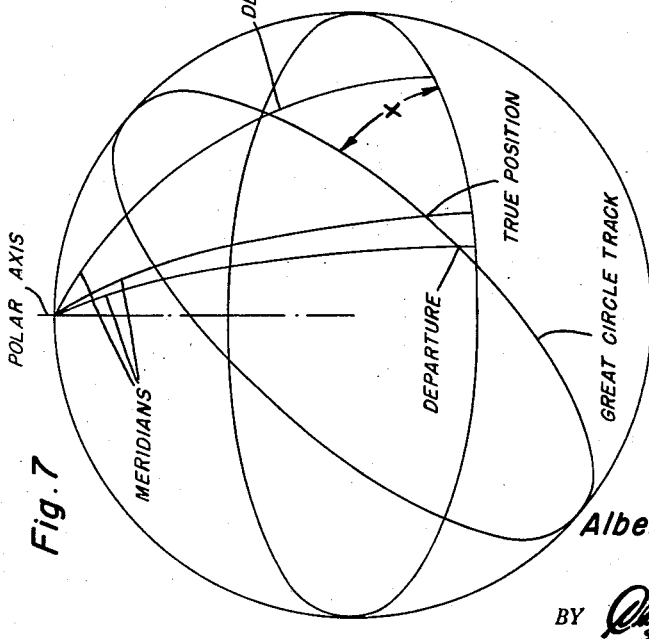

United States Patent Office 2,839,921
Patented June 24, 1958

2,839,921

POSITION INDICATOR

Albert Wood, Albuquerque, N. Mex., assignor, by direct and mesne assignments, to Engineering Development Co., Inc., Albuquerque, N. Mex., a corporation of New Mexico Application September 21, 1955, Serial No. 535,710

10 Claims. (Cl. 73—178)

This invention relates to a navigational aid and more particularly to a novel comparison indicator.

The primary object of the present invention resides in the provision of a navigational aid adapted to offer to the navigator a quick, easy and reliable solution of the astronomical triangle without recourse to tables or any of the several other methods of computation which may require the use of a "sight" of a celestial or terrestrial body.

A further object of the invention resides in the provision of a comparison position indicator which will enable a navigator to ascertain his position at night, in a dense fog, heavy overcast, dense smoke, or in the case of a submarine, while under water by eliminating the necessity for using other navigational aids outside the dirigible vehicle on which this invention is employed.

The theory of operation of this comparison position indicator is based on a tangent plane theory of cartography.

In order to overcome errors existing in all present day map-projections it is necessary to construct a map on the tangent-plane principle which is as follows:

All methods employing projections are eliminated and in their places substituted a system where the geographical system on the oblate sphere composing the surface of the earth are translated from that surface to the plane surface of the map.

As an illustration of what is meant by translation such as exemplified by the action of a large rubber ball whose surface has been coated with printer's ink and rolled along the plane surface of a large sheet of white paper. The path followed by the rubber ball along the surface of the white paper will be clearly shown on that surface, and any irregularities in its travel will be indicated not only as to direction, but also as to distance travelled on each directional heading. There will be no distortion in either direction or distance and if the lines of translation are sufficient to cover the entire surface of the oblate spheroid, then the errors involved would also be without distortion in any sense.

For the purpose of the comparison position indicator comprising the present invention, one segment of the earth's surface extending from the elevated pole to the equator and comprising one-quarter of the earth's surface within the above stated limits is used.

The elevated pole is the center from which the parallels of latitude are drawn and the pole distance is the radius to each respective latitude from the pole to the equator. The lengths of one degree of latitude for degree from the equator to the pole is found in Table 6 of H. O. No. 9 (Bowditch) and in laying out a map these distances should be followed as closely as the scale will permit.

The meridians of longitude extend from the pole as the center to the equator, and the length of one degree of longitude are also found in Table 6 of H. O. No. 9 (Bowditch) and the distances so indicated by this table must be followed as closely as the scale will permit. A map utilizing this tangent-plane principle as the basis of its construction will provide the cartographer or navigator with a system by which geographical points may be located accurately and from which the distances and directions may be measured with an accuracy inherent to the size of the scale to be used.

Still further objects and features of this invention reside in the provision of a navigational aid which is adapted to provide a self-correcting means for extrapolating the dead reckoning position to the true position, which is simple, compact, efficient in operation, and capable of being utilized in a convenient manner after a minimum period of training in the operation thereof.

These, together with various ancillary objects and features of the invention which will become apparent as the following description proceeds, are attained by this comparison position indicator, a preferred embodiment of which has been illustrated in the accompanying drawings, by way of example only, wherein:

Figure 1 is a sectional view of the invention illustrating in plan view the major operating parts thereof with the cover of the apparatus removed and illustrating the various connections between the latitude and longitude gears and the direct reading dials;

Figure 2 is a vertical sectional view as taken along the plane of line 2—2 in Figure 1 illustrating the construction of the rack means including the spaced arcuate racks representing the equator;

Figure 3 is an enlarged vertical sectional view as taken along the plane of line 3—3 in Figure 1 illustrating the construction of the gear trains utilized in conjunction with the direct reading dials;

Figure 4 is a sectional view as taken along the plane of line 4—4 in Figure 3 further illustrating the construction of the gear trains for the direct reading dials;

Figure 5 is an enlarged sectional detail view as taken along the plane of line 5—5 in Figure 1 illustrating in particular the cooperation of the latitude gear with the rack on the mechanical longitude arm and further showing the cooperation of the speed gear with the great circle track guide;

Figure 6 is an enlarged sectional detail view as taken along the plane of line 6—6 in Figure 2 illustrating the construction of the slide on the latitude arm and further indicating the arrangement of parts for directing the output of the latitude correction means of a gyro compass to the slide;

Figure 7 is a schematic diagram illustrating the navigational problem which this invention is adapted to simplify;

Figure 8 is a schematic diagram illustrating the manner in which the invention solves a navigational problem;

Figure 9 is a partial perspective detail view of the arrangement of the mechanical arm with the great circle track guide and further showing the indicator cooperating with the protractor and the great circle track guide to provide a course indication;

Figure 10 is a sectional detail view as taken along the plane of line 10—10 in Figure 1 illustrating the construction of the clamp means utilized in the invention for holding the great circle track guide in its desired position;

Figure 11 is a vertical sectional detail view illustrating the construction of the clamp means at the destination position; and Figure 12 is a partial perspective view of the gear arrangement on the mechanical arm.

Comparison position indicator 20 has a housing 22 of any convenient shape and size dependent upon the size and character of the dirigibile vehicle on which the invention is to be utilized. The invention is adapted for use in conjunction with marine, air, or land navigation and is especially adapted for use in aircraft while being feasible for use in conjunction with guided missiles.

Within the housing a pivot center 24 is provided about which there are vertically spaced arcuate racks 26 and 28 at a selected radial distance depending on the scale to which the invention is constructed. The arcuate racks 26 and 28 are in the shape of a quadrant of a circle and have their outer surfaces provided with suitable teeth with the rack created by the teeth having its pitch line serving to represent the equator in the solution of the navigational problem.

The racks 26 and 28 are interconnected by a web 30. Pivoted at the pivot center 24 is a first mechanical arm 32 having a rack 34 the pitch line of which extends through the elevated pole. As can be seen best in Figure 12, the mechanical arm 32 has rotatably mounted thereon by means of a shaft 36 a gear 38 which intermeshes with a gear 40 on shaft 42, the gear 40 intermeshing with the teeth on the rack 26. At the upper end of the arm 32 there is a pointer 44 affixed thereto which cooperates with a protractor 46 mounted on the housing 22.

Also pivoted at the pivot center 24 is a second arm 48 having teeth forming a rack 50 thereon which also has a gear 52 rotatably mounted thereon intermeshing with a gear 54 which engages the teeth on the rack 28. A pointer 56 is provided on the arm 48 and cooperates with the pointer 44 and the protractor 46 in order to determine a meridian angle for a purpose to be henceforth explained.

A great circle track guide 58 is provided and includes track members 60 and 62 the track member 62 being provided with teeth thereon forming a rack as at 64. Adjustable clamp members as at 66 and 68 hold the great circle track guide 58 in its selected position. These clamp members 66 and 68 are of a special construction which can be best seen in Figure 10 and each includes an anchor pin as at 70 having a fixed collar 72 thereon as well as a movable collar 74 adjustably clampingly held in place by means of a nut 76 so as to engage and hold a portion of the housing 22 between the collars 72 and 74.

The pins 70 are bifurcated for pivotal reception of studs 78 which are threaded as at 80 for reception of wing nuts 82 threadedly engaged thereon which wing nuts cooperate with the collar 84 and clampingly engaging and holding the track guide 58 in position.

As can be seen best in Figures 1, 5 and 9 there is mounted on the arm 32 movable means including a slide 85 having upper and lower T-shaped plates 86 and 88 having a shaft 90 journaled therein which shaft carries a longitude gear 92 engageable with the rack 34 of the arm 32. A protractor 94 is carried by the plate 92 and is affixed thereto. Rotatably mounted are suitable rollers 96 which are provided for restraining the movement of the slide 85. Rotatably mounted by means of a stub shaft 98 is a shoe 100 which carries an arm 102 having a pointer indicator 104 thereon which indicator cooperates with the protractor 94 to read the course of the dirigible vehicle on which the position indicator is mounted.

The shoe 100 therefore couples the slide 85 to a plate 106 which is positioned above the great circle track 58 and is joined to a plate 108 below the great circle track 58 by means of pins 110 or the like carrying rollers 112 which restrain the relative position of the plates 106 and 108 with respect to the great circle guide track 58. A gear 114 engages the rack 64 and is mounted on a shaft 116 journaled in the plate 108.

Movable means including a slide 118 Is movably mounted on the arm 48 and includes upper and lower substantially T-shaped plates 120 and 122. A roller 124 is journaled in a pin 126 for aid in restraining the position of the slide 118 and a latitude gear 128 is mounted on a shaft 130 journaled in the plates 120 and 122. The shaft 130 has a gear 132 mounted thereon which intermeshes with a gear 134 mounted on a shaft 136 connected by a flexible shaft 138 to the compensating motor 140 for the gyro 142. This compensating motor 140 is in the nature of the conventional latitude correction mechanism as is provided as a means for maintaining the gyro in its vertical position as the latitude changes the movement of the dirigible vehicle. A suitable bracket 144 is provided for aiding in the support of the shaft 136.

Secured to the plate 122 is a protractor 146 which cooperates with an indicator 148 mounted on a shoe 150 which is positioned so as to engage the destination guide 152. The destination guide 152 includes a pair of spaced members 154 and 156 and is clampingly held in position at the pivot point 158 which is the destination point or position.

In order to move the arm 32 along the great circle guide track 58 there is provided means for driving the speed gear 114 which includes a flexible drive shaft 160 connected to the motor drive 164 of a tachometer 166 of the reduction type having the range of 1:1000, or thereabout whereby the estimated speed of travel of the dirigible vehicle can be applied to this position indicator. As will hereinafter become apparent, this original estimated speed may be corrected and becomes self-correcting during proper operation of the invention.

Connected to the gears 38 and 52 by means of flexible shafts 170 and 172 are gear trains including gears 174 and 176 mounted on shafts 178 and 180 driven respectively by the shafts 172 and 170. The gears 174 and 176 intermesh with other gears 182 and 184 which in turn mesh with gears 186 and 188. The gears 186 and 188 drive coaxial shafts 190 and 192 which in turn actuate pointers as at 194 and 196 representing minutes of longitude of the direct reading dial 198. By means of suitable gear trains indicated generally at 200 and 202 coaxial shafts 204 and 206 are driven to position pointer indicators 208 and 210 whereby a direct reading dial 212 degrees of longitude is provided. Similar direct reading dials 213 and 214 are provided for direct reading of the latitude and have pairs of pointers as at 216, 218 and 220, 222 provided therefor. These latitude indicators for both minutes and degrees are driven through flexible shafts 223 and 224 which are connected respectively to the gears 128 and shaft 130 and to the gear 92 and shaft 90.

An indicator 240 is provided for the reading of the angle formed by the great circle course and the equator which angle is designated X in Figure 7. This angle is the angle of intercept between the plane containing the great circle course between the point of departure and the point of destination and the plane containing the equator and remains constant during the voyage of the vessel to its destination from its point of departure. It is to be recognized that this angle does not remain constant with respect to the latitude meridians but remains constant insofar as two planes in space are considered. Therefore, so long as this angle remains constant the dirigible vehicle will be on its great circle track during its journey. The mechanism of the dial 240 is connected to the gyroscope 142 in the conventional manner since the input of this angle which is applied on the gyro 142 in the conventional manner will result in a change of the angle on the dial 240 should the vessel get off its great circle track. The arrangement of the dial 240 is therefore of a conventional nature.

Referring now to the navigational problems which this invention is adapted to solve, and with particular reference to Figure 8 wherein there is shown the manner in which the invention may be utilized for the solution of the problem, it is noted that the preparatory stage before starting the trip the great circle track arm 58 is clamped in both latitude and longitude at the points of departure 250 and the destination point 252. The indicators of the dials for latitude and longitude may be used for this positioning so as to take advantage of the enlargement of scale provided by the respective gear trains. In this manner a closer definition may be obtained in positioning these points. These points, of course, are marked on the map constructed in accordance with the tangent plane theory previously defined.

The mechanical arm 32 is then brought to the side of the housing from which it is desired to operate, east or west travel, and the mechanical longitude is set off on its proper dial.

The slide 85 is then brought to the latitude of the point of departure and the slide indicator shoe 100 which fits into the plate 106 and also fits into the great circle track guide 58 is then fitted into the great circle track guide 58.

The destination guide 152 is then brought into coincidence with the point of destination as at 252 and the mechanical arm 48 is swung into coincidence with arm 32. This has caused a rotor counter which may be associated with the gear 52, not shown, to measure the distance in article miles from the destination to the point of departure where the action of the rotor counter is reversed and any farther action along the great circle track arm substitutes the total distance giving the remaining distance to the destination. This rotor counter is a conventional apparatus.

At this point the mechanical course and gyro course indicators 104 and 148 should read the same while the pole meridian indicator should read zero and the indicators of the various pointers of the driven direct reading dials should read the same.

In operation as long as no differentials in operation are present, the arms 32 and 48 will coincide. The arm 32 will be driven along the great circle track 58 by the tachometer 166 while the movement of the arm 48 will be controlled by the input from the compensating motor for the gyro. Therefore, should the change in the latitude be such as to show that the dirigible vehicle is moving on a path not coincident with the plane great circle route, the arm 32 will no longer overlie the arm 48 and this difference in the position may be read directly on the direct reading dials and the meridian angle between the pointers 44 and 56 will indicate the change of course necessary to regain the great circle course. The protractor 46 is of course calibrated to the extent necessary.

In an actual solution to a problem, it may be desired to depart from the point of departure at the latitude and longitude shown in Figure 8 and to arrive at the destination point having its own latitude and longitude. If the tachometer input to the arm 32 is such as to move the arm 32 along the great circle track guide a distance of two hundred miles when in actuality the true position as indicated by the latitude is two hundred and fifty miles from the point of departure, the latitude correction from the gyro thus moving the arm 48 to the position shown in Figure 8, this distance will cause the relative change of position of the arms 32 and 48 causing the pointers as at 44 and 56 to provide a clear indication of the course change necessary to correct for the error. In addition, the difference in the mileage may be easily read mechanically using any suitable measuring instrument such as protractors or the like and this corrected ground speed can then be set into the apparatus using the tachometer. After a minimum period of time of use, the correct ground speed will have been obtained and only the effects of wind, current and tide as well as incorrect steering and other minor operational difficulties will result in the necessity of course change which will immediately show up by the separation of the arms 32 and 48 from their overlying relative position.

If, on the other hand, there is a change in destination of the vehicle, the only thing necessary to achieve the solution to the navigational problem at that time would be to change the great circle track guide 58 from its original destination to the new destination point leaving the present position in its original location. This will, of course, provide an immediate indication of the correct change in course and therefore of the correct course to be followed to achieve the new destination.

Since numerous modifications and equivalents will be readily perceivable to those skilled in the art after a consideration of the foregoing specification and accompanying drawings, it is not intended to limit the invention to the precise embodiment shown and described, but all suitable modifications and equivalents may be resorted to which fall within the scope of the appended claims.

What is claimed as new is as follows:

1. A comparison position indicator comprising arcuate rack means for representing the equator, a first arm carrying first gear means in engagement with said rack means, a second arm carrying second gear means in engagement with said rack means, a pivot point for representing the elevated pole, said first arm and said second arm being pivoted at said pivot point, a great circle track guide intercepting points representing departure and destination positions, a destination guide pivoted at said destination position, movable means connecting said destination guide to said second arm for representing true position, and slide means movably mounted on said first arm at said departure position engaging said track guide to move said first arm along said track guide corresponding to estimated ground speed.

2. A comparison position indicator comprising arcuate rack means for representing the equator, a first arm carrying first gear means in engagement with said rack means, a second arm carrying second gear means in engagement with said rack means, a pivot point for representing the elevated pole, said first arm and said second arm being pivoted at said pivot point, a great circle track guide intercepting points representing departure and destination positions, a destination guide pivoted at said destination position, movable means connecting said destination guide to said second arm for representing true position, and slide means movably mounted on said first arm at said departure position engaging said track guide to move said first arm along said track guide corresponding to estimated ground speed, a first indicator pointer on said first arm, a second indicator pointer of said second arm, and a protractor at said elevated pole, said first and second indicator pointers overlying said protractor and cooperating with said protractor.

3. A comparison position indicator comprising arcuate rack means for representing the equator, a first arm carrying first gear means in engagement with said rack means, a second arm carrying second gear means in engagement with said rack means, a pivot point for representing the elevated pole, said first arm and said second arm being pivoted at said pivot point, a great circle track guide intercepting points representing departure and destination positions, a destination guide pivoted at said destination position, movable means connecting said destination guide to said second arm for representing true position, and slide means movably mounted on said first arm at said departure position engaging said track guide to move said first arm along said track guide corresponding to estimated ground speed, said track guide including spaced track members, one of said track members having a rack thereon, said slide means including a slide carrying a speed gear meshing with said rack on one of the track members.

4. A comparison position indicator comprising arcuate rack means for representing the equator, a first arm carrying first gear means in engagement with said rack means, a second arm carrying second gear means in engagement with said rack means, a pivot point for representing the elevated pole, said first arm and said second arm being pivoted at said pivot point, a great circle track guide intercepting points representing departure and destination positions, a destination guide pivoted at said destination position, movable means connecting said destination guide to said second arm for representing true position, and slide means movably mounted on said first arm at said departure position engaging said track guide to move said first arm along said track guide corresponding to estimated ground speed, said track guide including spaced track members, one of said track members having a rack thereon, said slide means including a slide carrying a speed gear meshing with said rack on one of the track members, and a variable speed tachometer driving said speed gear.

5. A comparison position indicator comprising arcuate rack means for representing the equator, a first arm carrying first gear means in engagement with said rack means, a second arm carrying second gear means in engagement with said rack means, a pivot point for representing the elevated pole, said first arm and said second arm being pivoted at said pivot point, a great circle track guide intercepting points representing departure and destination positions, a destination guide pivoted at said destination position, movable means connecting said destination guide to said second arm for representing true position, and slide means movably mounted on said first arm at said departure position engaging said track guide to move said first arm along said track guide corresponding to estimated ground speed, a rack on said second arm, said movable means including a latitude gear engaging said rack on said second arm, and means responsive to changes in latitude for driving said latitude gear engaging said latitude gear.

6. A comparison position indicator comprising arcuate rack means for representing the equator, a first arm carrying first gear means in engagement with said rack means, a second arm carrying second gear means in engagement with said rack means, a pivot point for representing the elevated pole, said first arm and said second arm being pivoted at said pivot point, a great circle track guide intercepting points representing departure and destination positions, a destination guide pivoted at said destination position, movable means connecting said destination guide to said second arm for representing true position, and slide means movably mounted on said first arm at said departure position engaging said track guide to move said first arm along said track guide corresponding to estimated ground speed, said track guide including spaced track members, one of said track members having a rack thereon, said slide means including a slide carrying a speed gear meshing with said rack on one of the track members, a rack on said first arm, and a longitude gear engaging said rack on said first arm.

7. A comparison position indicator comprising arcuate rack means for representing the equator, a first arm carrying first gear means in engagement with said rack means, a second arm carrying second gear means in engagement with said rack means, a pivot point for representing the elevated pole, said first arm and said second arm being pivoted at said pivot point, a great circle track guide intercepting points representing departure and destination positions, a destination guide pivoted at said destination position, movable means connecting said destination guide to said second arm for representing true position, and slide means movably mounted on said first arm at said departure position engaging said track guide to move said first arm along said track guide corresponding to estimated ground speed, a rack on said second arm, said movable means including a latitude gear engaging said rack on said second arm, and means responsive to changes in latitude for driving said latitude gear engaging said latitude gear, a gyro compass having latitude correction means, said means for driving said latitude gear being connected to said latitude correction means.

8. A comparison position indicator comprising arcuate rack means for representing the equator, a first arm carrying first gear means in engagement with said rack means, a second arm carrying second gear means in engagement with said rack means, a pivot point for representing the elevated pole, said first arm and said second arm being pivoted at said pivot point, a great circle track guide intercepting points representing departure and destination positions, a destination guide pivoted at said destination position, movable means connecting said destination guide to said second arm for representing true position, and slide means movably mounted on said first arm at said departure position engaging said track guide to move said first arm along said track guide corresponding to estimated ground speed, a rack on said second arm, said movable means including a latitude gear engaging said rack on said second arm, and means responsive to changes in latitude for driving said latitude gear engaging said latitude gear, a gyro compass having latitude correction means, said means for driving said latitude gear being connected to said latitude correction means, said track guide including spaced track members, one of said track members having a rack thereon, said slide means including a slide carrying a speed gear meshing with said rack on one of the track members whereby the estimated speed of travel can be applied to the position indicator.

9. A comparison position indicator comprising arcuate rack means for representing the equator, a first arm carrying first gear means in engagement with said rack means, a second arm carrying second gear means in engagement with said rack means, a pivot point for representing the elevated pole, said first arm and said second arm being pivoted at said pivot point, a great circle track guide intercepting points representing departure and destination positions, a destination guide pivoted at said destination position, movable means connecting said destination guide to said second arm for representing true position, and slide means movably mounted on said first arm at said departure position engaging said track guide to move said first arm along said track guide corresponding to estimated ground speed, a first indicator pointer on said first arm, a second indicator pointer of said second arm, and a protractor at said elevated pole, said first and second indicator pointers overlying said protractor cooperating with said protractor, a rack on said second arm, said movable means including a latitude gear engaging said rack on said second arm, and means responsive to changes in latitude for driving said latitude gear engaging said latitude gear.

10. A comparison position indicator comprising arcuate rack means for representing the equator, a first arm carrying first gear means in engagement with said rack means, a second arm carrying second gear means in engagement with said rack means, a pivot point for representing the elevated pole, said first arm and said second arm being pivoted at said pivot point, a great circle track guide intercepting points representing departure and destination positions, a destination guide pivoted at said destination position, movable means connecting said destination guide to said second arm for representing true position, and slide means movably mounted on said first arm at said departure position engaging said track guide to move said first arm along said track guide corresponding to estimated ground speed, a protractor on said slide means, a shoe engaging said track guide, and an indicator carried by said shoe cooperating with said protractor for indicating course.

References Cited in the file of this patent

UNITED STATES PATENTS

| | | |
|---|---|---|
| 2,386,555 | Hughes | Oct. 9, 1945 |
| 2,393,474 | Jones | Jan. 22, 1946 |